(12) United States Patent
Lee

(10) Patent No.: US 9,389,565 B2
(45) Date of Patent: Jul. 12, 2016

(54) IMAGE FORMING APPARATUS, COLOR REGISTRATION METHOD OF IMAGE FORMING APPARATUS, HOST APPARATUS, CONTROL METHOD OF HOST APPARATUS, AND COMPUTER READABLE RECORDING MEDIUM

(71) Applicant: Samsung Electronics Co., Ltd., Suwon-si, Gyeonggi-do (KR)

(72) Inventor: Ki-youn Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/081,084

(22) Filed: Nov. 15, 2013

(65) Prior Publication Data

US 2014/0153975 A1    Jun. 5, 2014

(30) Foreign Application Priority Data

Nov. 30, 2012 (KR) .................... 10-2012-0138158

(51) Int. Cl.
*G03G 15/00* (2006.01)
*H04N 1/50* (2006.01)
*G03G 15/01* (2006.01)

(52) U.S. Cl.
CPC ............ *G03G 15/5041* (2013.01); *G03G 15/01* (2013.01); *H04N 1/506* (2013.01)

(58) Field of Classification Search
USPC ......................................................... 399/301
See application file for complete search history.

(56) References Cited

U.S. PATENT DOCUMENTS

| | | | | |
|---|---|---|---|---|
| 5,227,815 A * | 7/1993 | Dastin et al. | ............... | 347/116 |
| 5,550,625 A * | 8/1996 | Takamatsu et al. | ............ | 399/301 |
| 6,320,668 B1 * | 11/2001 | Kim | ............... | H04N 1/40006 358/1.1 |
| 7,013,803 B2 * | 3/2006 | Hansen et al. | ............... | 101/181 |
| 7,876,342 B2 * | 1/2011 | Nishikawa et al. | ............ | 347/116 |
| 2004/0022556 A1 * | 2/2004 | Nomura | ............... | 399/116 |
| 2004/0160468 A1 * | 8/2004 | Kim et al. | ............... | 347/12 |
| 2005/0206982 A1 * | 9/2005 | Hattori | ............... | H04N 1/6033 358/532 |
| 2006/0227397 A1 * | 10/2006 | Goma | ............... | G03B 27/72 358/521 |
| 2008/0204773 A1 * | 8/2008 | Morgana | ............ | H04N 1/6033 358/1.9 |
| 2009/0290914 A1 * | 11/2009 | Cho | ............... | 399/301 |
| 2010/0302568 A1 * | 12/2010 | Kouguchi | ............... | 358/1.9 |
| 2011/0150511 A1 * | 6/2011 | Nomura et al. | ............... | 399/51 |
| 2011/0317182 A1 * | 12/2011 | Murayama et al. | ............ | 358/1.9 |
| 2012/0148315 A1 * | 6/2012 | Nakashima | ............... | 399/301 |
| 2012/0251150 A1 * | 10/2012 | Nara et al. | ............... | 399/66 |
| 2013/0078010 A1 * | 3/2013 | Inoue | ............... | G03G 15/0131 399/301 |
| 2013/0336666 A1 * | 12/2013 | Amit et al. | ............... | 399/15 |

* cited by examiner

*Primary Examiner* — Clayton E Laballe
*Assistant Examiner* — Linda B Smith
(74) *Attorney, Agent, or Firm* — Staas & Halsey LLP

(57) ABSTRACT

A color registration method of an image forming apparatus, a control method of a host device, an image forming apparatus, a host apparatus, and a computer-readable recording medium are provided. The method includes printing a preset test pattern for color registration, scanning the printed test pattern for color registration, detecting the printed test pattern for color registration from a scan image obtained as a result of the scanning, calculating location error values of respective colors, using the detected test pattern for color registration, and performing the color registration using the calculated location error values of respective colors.

6 Claims, 14 Drawing Sheets

FIG. 14

|        | Cyan | Magenta | Yellow |
|--------|------|---------|--------|
| Offset |      |         |        |
| Phase  |      |         |        |
| Skew   |      |         |        |

CANCEL   ENTER

IMAGE FORMING APPARATUS, COLOR REGISTRATION METHOD OF IMAGE FORMING APPARATUS, HOST APPARATUS, CONTROL METHOD OF HOST APPARATUS, AND COMPUTER READABLE RECORDING MEDIUM

CROSS-REFERENCE TO RELATED APPLICATIONS

This application is related to, and claims priority to, Korean Patent Application No. 10-2012-0138158, filed on Nov. 30, 2012, in the Korean Intellectual Property Office, the disclosure of which is incorporated herein by reference.

BACKGROUND

1. Field

Embodiments of the present disclosure relate to image forming, and more particularly, to an image forming apparatus, a color registration method of an image forming apparatus, a host apparatus, a control method of a host apparatus, and a computer-readable recording medium, which perform color registration using scanning result with respect to a test pattern implemented for color registration.

2. Description of the Related Art

An image forming apparatus generally operates to print out print data generated at a terminal such as a computer onto a printing paper. An example of an image forming apparatus includes a copier, a printer, a facsimile and a multi function peripheral (MFP) that provides combined functionality of at least two of the single apparatuses.

Laser image forming apparatuses are replacing image forming apparatuses such as dot image forming apparatuses or inkjet image forming apparatuses, because of improved printing quality, speed, and/or noise during printing operation. A laser image forming apparatus generally operates to apply a toner onto an OPC (Organic Photo Conductive) using a laser ray modulated into picture signal, transfer toner from the surface of the OPC onto a printing sheet, and fixing the toner onto the printing sheet using high temperature and pressure.

A color laser printer has been distributed, which is a laser image forming apparatus that can implement color printing. A color printer generally expresses color images using four colors, i.e., CMYK.

The color laser image forming apparatus may be classified as a single path system that has four laser and four OPC, or a multi-path system that has one laser and one OPC.

To implement accurate color expression, each printing scheme may be required to transfer toner to accurate locations in an overlapping manner. However, an error in the locations of toner transfer increases as a number of printing sheets increases caused by, for example, an operational error among the transferring devices, resulting in problems such as appearance of a white-gap at a location where different colors meet, or a defect in the printed image.

To attempt to address such problems, an image forming apparatus may employ an auto color registration (ACR) function. ACR may be an automatically-performed process, in which a separate sensor senses a test pattern for color registration transferred onto an intermediate transfer belt and calculates an offset amount for the color registration using the sensed result.

To attempt to address the problems, a user may visually check a test pattern for color registration, and calculate an offset amount for color registration.

A problem occurs in that the ACR may have a limit in providing an accurate measure of the offset amount for color registration, due, for example, to contamination of the sensor or insufficient precision.

The manual method color registration, which is done by the user, also has shortcomings of deteriorating accuracy of an offset amount since the offset amount is determined based on the visual observation of the user, or an inaccurate offset since the offset amount for color registration is limited to only offset locations.

SUMMARY

Additional aspects and/or advantages will be set forth in part in the description which follows and, in part, will be apparent from the description, or may be learned by practice of the invention.

Exemplary embodiments of the present invention overcome the above disadvantages and other disadvantages not described above. However, an exemplary embodiment of the present invention is not required to overcome the disadvantages described above.

Exemplary embodiments of the present invention include an image forming apparatus, a color registration method of an image forming apparatus, a host apparatus, a control method of a host apparatus, and a computer-readable recording media, which calculates an error value of each color using a test pattern for color registration as detected from a scan image.

According to an exemplary embodiment, a color registration method of an image forming apparatus is provided, which may include printing a preset test pattern for color registration, scanning the printed test pattern for color registration, detecting the printed test pattern for color registration from a scan image obtained as a result of the scanning, calculating location error values of respective colors, using the detected test pattern for color registration, and performing the color registration using the calculated location error values of respective colors.

The preset test pattern for color registration may include a plurality of pairs of a first color line and combined lines of a second color line, a third color line, a fourth color line,—a fifth color line, and a second color line in sequence. A first color may be one of cyan C, magenta M, yellow Y, and black K. The second, third, fourth and fifth colors may be different colors from each other and each may be one of cyan C, magenta M, yellow Y and black K.

Detecting the printed test pattern for color registration may include detecting the printed test pattern for color registration by detecting the first color line from the scan image, and the calculating may include calculating median location values of respective color lines constituting the combined lines, and calculating the location error values for respective colors using the calculated median location values of respective color lines.

Calculating the median location values of respective color lines constituting the combined lines may include calculating location values of a first edge and a second edges of the respective color lines, calculating linear equations for the first and second edges, using the calculated location values of the first and second edges, and calculating the median location values based on middle locations of a distance between the calculated linear equations of the first and second edges.

The color registration method may include compensating a distortion of the scan image using the median location values of the second color line at both ends, among the calculated median location values of the combined lines.

The calculating the location error values may include calculating an offset location error value that is an average moving distance of each of the third, fourth and fifth color lines included in the combined lines with respect to the calculated median location value of the second color line, calculating a phase location error value that is a difference of phase in the paper advancing direction of the third, fourth, and fifth color lines included in the combined lines with respect to the calculated median location value of the second color line, and calculating a skew location error value that is a difference of phase in the vertical direction to the paper advancing direction of the third, fourth and fifth color lines included in the combined lines with respect to the calculated median location value of the second color line.

If the color registration is performed, the color registration method may include printing the test pattern for color registration that reflects the result of color registration as performed.

According to an exemplary embodiment, a color registration method of an image forming apparatus is provided, which may include printing a preset test pattern for color registration, displaying a screen to receive 'location error values of respective colors' that are calculated using the printed test pattern for color registration, and if the location error values are inputted to the displayed screen, performing the color registration using the inputted location error values. The location error values may be calculated using a scan image that is generated by scanning at an image reading device the printed test pattern for color registration of the image forming apparatus.

According to an exemplary embodiment, a control method of a host device is provided, which may include receiving from an image reading device a scan image that is generated as a result of scanning a test pattern for color registration printed at an image forming apparatus, detecting the printed test pattern for color registration from the scan image, and calculating location error values of respective colors using the detected test pattern for color registration.

The control method may include displaying the calculated location error values of respective colors on a screen.

The control method may include transmitting the calculated location error values of respective colors to the image forming apparatus connected to the host device.

According to an exemplary embodiment, an image forming apparatus is provided, which may include an image forming unit that prints a preset test pattern for color registration, a scanner that scans the printed test pattern for color registration, and a controller that detects the printed test pattern for color registration from a scan image according to the scanning, calculates location error values of respective colors using the detected test pattern for color registration, and controls the image forming apparatus to perform color registration using the calculated location error values of respective colors.

The preset test pattern for color registration may include a plurality of pairs of a first color line and combined lines of a second color line, a third color line, a fourth color line, a fifth color line, and a second color line in sequence, and the first color may be one of cyan C, magenta M, yellow Y, and black K, and the second, third, fourth and fifth colors may be different colors from each other and each may be one of cyan C, magenta M, yellow Y and black K.

The controller may detect the printed test pattern for color registration by detecting the first color line from the scan image, and calculate median location values of respective color lines constituting the combined lines, and calculate the location error values for respective colors using the calculated median location values of respective color lines.

The controller may calculate location values of a first edge and a second edges of the respective color lines, calculate linear equations for the first and second edges, using the calculated location values of the first and second edges, and calculate the median location values based on middle locations of a distance between the calculated linear equations of the first and second edges.

The controller may calculate the location error values including an offset location error value that is an average moving distance of each of the third, fourth and fifth color lines included in the combined lines with respect to the calculated median location value of the second color line, a phase location error value that is a difference of phase in the paper advancing direction of the third, fourth, and fifth color lines included in the combined lines with respect to the calculated median location value of the second color line, and a skew location error value that is a difference of phase in the vertical direction to the paper advancing direction of the third, fourth and fifth color lines included in the combined lines with respect to the calculated median location value of the second color line.

According to an exemplary embodiment, an image forming apparatus is provided, which may include an input that receives a user input with respect to the image forming apparatus, an image forming unit that prints a preset test pattern for color registration, a display that displays a screen to receive 'location error values of respective colors' that are calculated using the printed test pattern for color registration, and a controller that controls the image forming apparatus to perform color registration using the location error values, if the location error values are inputted to the displayed screen. The location error values may be calculated using a scan image that is generated by scanning at an image reading device the printed test pattern for color registration of the image forming apparatus.

According to an exemplary embodiment, a host device is provided, which may include a display that displays a screen, a communicator that receives from an image reading device a scan image generated as a result of scanning a printed test pattern for color registration of an image forming apparatus, and a controller that detects the printed test pattern for color registration from the scan image, calculates location error values of respective colors using the detected test pattern for color registration, and controls the display to display the calculated location error values of respective colors on the screen.

According to an exemplary embodiment, a computer readable recording medium recording therein a program code to implement a color registration method of an image forming apparatus is provided, in which the color registration method may include printing a preset test pattern for color registration, scanning the printed test pattern for color registration, detecting the printed test pattern for color registration from a scan image obtained as a result of the scanning, calculating location error values of respective colors, using the detected test pattern for color registration, and performing the color registration using the calculated location error values of respective colors.

According to an exemplary embodiment, when accurate color registration is not obtained by automatic color registration, accurate color registration can be performed by detecting printed test pattern for color registration from a scan image and calculating location error values of respective colors.

Whereas automatic color registration may perform color registration only based on the images on the intermediate transfer belt, according to an exemplary embodiment of the present invention, the color registration can be performed based on outputs printed after transferring, fusing or paper feeding. Accordingly, it is possible to reflect variations due to operations of transferring, fusing and/or paper feeding.

Since test pattern for color registration may be detected from a scan image, the pattern for color registration can be smaller than the test pattern for color registration generally used in automatic color registration.

Since location error values of respective colors may be displayed upon calculating, the user is able to perform color registration with increased ease.

BRIEF DESCRIPTION OF THE DRAWINGS

The above and/or other aspects of the present invention will be more apparent by describing certain exemplary embodiments of the present invention with reference to the accompanying drawings, in which:

FIG. 14 illustrates a screen to receive a location error value per color according to an embodiment.

DETAILED DESCRIPTION

Figure 1:
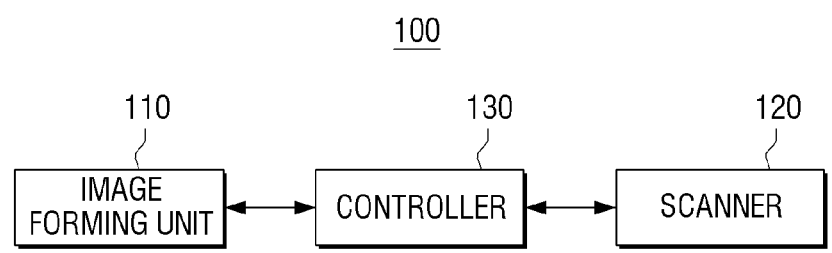
FIG. 1 illustrates an image forming apparatus according to an exemplary embodiment.

Certain exemplary embodiments of the present invention are described in greater detail with reference to the accompanying drawings.

In the following description, same drawing reference numerals are used for the same elements even in different drawings. The matters defined in the description, such as detailed construction and elements, are provided to assist in a comprehensive understanding of the present invention. Accordingly, it is apparent that the exemplary embodiments of the present invention can be carried out without those specifically defined matters.

FIG. 1 illustrates an image forming apparatus according to an exemplary embodiment.

Referring to FIG. 1, the image forming apparatus 100 includes part or all of an image forming unit 110, a scanner 120, a controller 130. The image forming apparatus 100 according to an exemplary embodiment may be implemented as a multi function peripheral (MFP) that includes both the image forming unit 110 and the scanner 120. The image forming apparatus 100 may be implemented as a laser image forming apparatus.

The image forming apparatus prints out an image via the processes of charging, writing, developing, transferring, and fusing. The charging is an operation to apply high voltage (approximately 700V) onto a charger to cause an electric charge (−) to be formed on a surface of a OPC by corona discharge. The writing is an operation to emit a laser beam onto the surface of the OPC where (−) charge is formed to extinguish (−) charge into form of characters, and thereby form a latent image. The developing is an operation in that toner particles with (−) components are attached onto the latent image on the surface of the OPC. The transfer is an operation to form (+) charge on an opposite surface of the printing paper by applying a predetermined transfer voltage at the transfer device when the paper passes between the OPC and the transfer device, to draw (−) toner particles formed on the surface of the drum toward the printing paper. The fusing is an operation to fix the toner formed on the printing paper by fusing, with appropriate heat and pressure thereon. The printing paper with an image formed thereon is then outputted.

The image forming unit 110 may perform the operations to form an image, i.e., charging, writing, developing, transferring and fusing. To perform the operations, the image forming unit 110 may include a paper feeder that feeds printing paper, a charger that performs charging, a laser that performs writing, C, M, Y, K developers that perform developing, a OPC on which a printing image is developed, a transfer unit which performs transferring, a fuser that performs fusing, and a discharger that discharges output paper.

The image forming unit 110 may print a preset test pattern for color registration. The image forming unit 110 may read out the test pattern for color registration that is either stored in advance or received from an external device, and performs the image forming job including the above-explained charging, writing, developing, transferring and fusing, and print the preset test pattern for color registration onto the printing paper.

The test pattern for color registration may be defined as a test pattern used at the image forming apparatus 100 for a color registration purpose. The preset test pattern for color registration may include a plurality of pairs of lines including a first color line 501 and combined lines of a second color line 502-1, a third color line 502-2, a fourth color line 502-3, a fifth color line 502-4, and a second color line 502-5 in sequence. The first color may be one of cyan C, magenta M, yellow Y and black K. The second, third, fourth and fifth colors may be different colors from each other and may be one of cyan C, magenta M, yellow Y and black K.

Figure 5A:
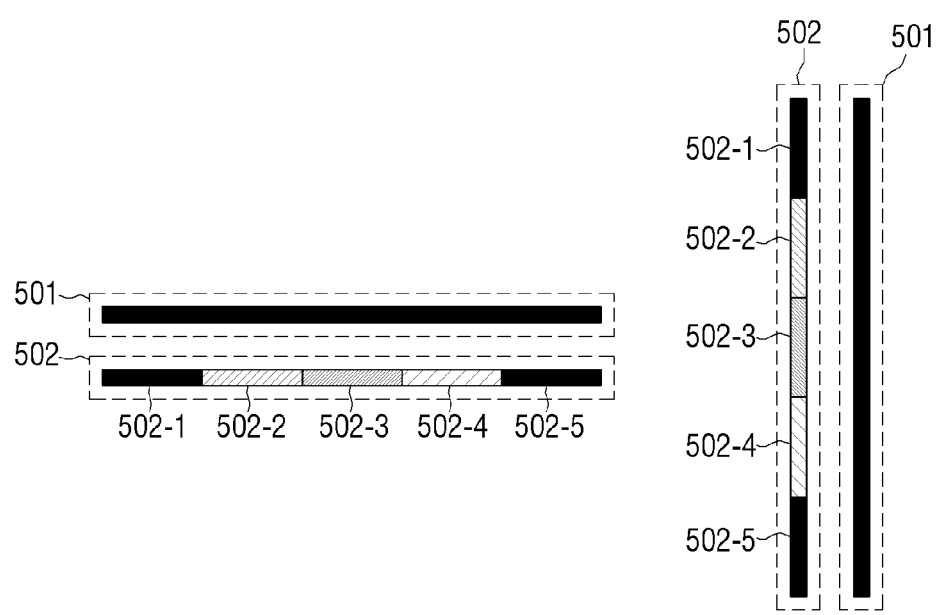
FIGS. 5A-5B illustrate an exemplary preset test pattern for color registration according to an embodiment.
Figure 5B:
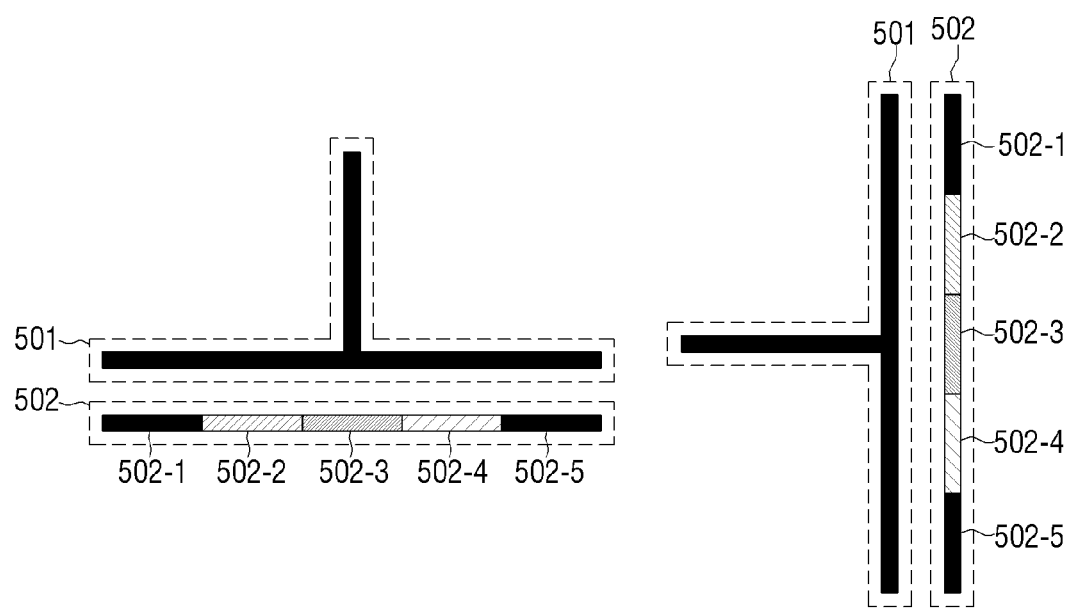

FIGS. 5A-5B illustrate an exemplary preset test patterns for color registration according to an embodiment. Referring to FIGS. 5A-5B, the one of a plurality of preset test patterns for color registration may include a first color line 501 and combined lines of a second color line 502-1, a third color line 502-2, a fourth color line 502-3, a fifth color line 502-4, and a second color line 502-5 in sequence. The first color may be black K, the second color may be black K, the third color may be cyan C, the fourth color may be magenta M, and the fifth color may be yellow Y, but the colors are not limited thereto.

The single-colored, first color line 501 may be used to detect the printed test pattern for color registration from a scan image. The first color line 501 may be a straight line as illustrated in FIG. 5A. Alternatively, referring to FIG. 5B, the first color line 501 may include a combination of a straight line and a vertical line. If the first color line 501 is provided as illustrated in FIG. 5B, the printed test pattern for color registration may be detected more conveniently than the first color line 501 of FIG. 5A, and may be used to compensate for the distortion value that is generated due to rotation of an image during printing of the test pattern for color registration or scanning of the printed test pattern for color registration.

The lines 502-1, 502-5 on both ends of the combined line 502 may be the same color. This compensates for the distortion value that is generated due to rotation of an image when the test pattern for color registration is printed or scanned. A reason for having the lines 502-1, 502-5 on both ends of the combined line 502 is because lines 502-1, 502-5 may be used to calculate the location error values (including offset location error value, phase location error value, skew location error value).

The preset test pattern for color registration may include a plurality of pairs of first color line 501 and combined line 502 in one page data. Thus, it is possible to increase the accuracy of color registration with a plurality of location error values calculated.

The scanner 120 scans the printed test pattern for color registration and generates scan image data. The scanner 120 may implement at least one of auto document feeder method and flatbed method.

The controller 130 controls the overall operation of the image forming apparatus 100. The controller 130 may control all or part of the image forming unit 110, and the scanning unit 120.

The controller 130 may determine whether it is necessary to perform color registration. That is, the controller 130 may determine that color registration is necessary if the printing exceeds a predetermined paper sheets and upon receipt of a command to perform color registration from the user.

If determining that color registration is necessary, the controller 130 may control the image forming apparatus 110 to print the preset test pattern for color registration.

If the scan image of the printed test pattern for color registration is generated at the scanner 120 according to the scanning operation by the user with respect to the printed test pattern for color registration, the controller 130 may detect the printed test pattern for color registration from the scan image. According to an example, the controller 130 may detect the printed test pattern for color registration by detecting the first color line 501 from the scan image.

The controller 130 may calculate the location error values of the respective colors using the detected test pattern for color registration. According to an exemplary embodiment, the controller 130 may calculate the location error values of the respective colors by calculating median location values of the respective constituent color lines of the combined lines 502, i.e., the second color line 502-1, third color line 502-2, fourth color line 502-3, fifth color line 502-4, and second color line 502-5, and using a calculated median of location values of the respective color lines.

To calculate the median location values of the respective color lines, the controller 130 may generate profiles of the respective color lines using a window of height (n) on the respective constituent color lines of the combined lines 501, i.e., the second color line 502-1, third color line 502-2, fourth color line 502-3, fifth color line 502-4, and second color line 502-5, calculating location values of a first edge and a second edge of the respective color lines using generated profiles, calculating linear equations with respect to the first and second edges of the respective color lines using the calculated location values of the first and second edges of the color lines, and calculating middle locations of the distances of the linear equations of the respective color lines. The middle locations of the distances between the linear equations of the respective color lines may be median location values of the respective color lines.

The controller 130 may calculate error values with respect to the respective colors, using the calculated median location values of the color lines.

The location error values may include an offset location error value that is an average moving distance of each of the third, fourth and fifth color lines included in the combined lines with respect to the calculated median location value of the second color line, a phase location error value that indicates a difference of phase in the paper advancing direction of the third, fourth, and fifth color lines included in the combined lines with respect to the calculated median location value of the second color line, and a skew location error value that indicates a difference of phase in the vertical direction to the paper advancing direction of the third, fourth and fifth color lines included in the combined lines with respect to the calculated median location value of the second color line.

Figure 10:
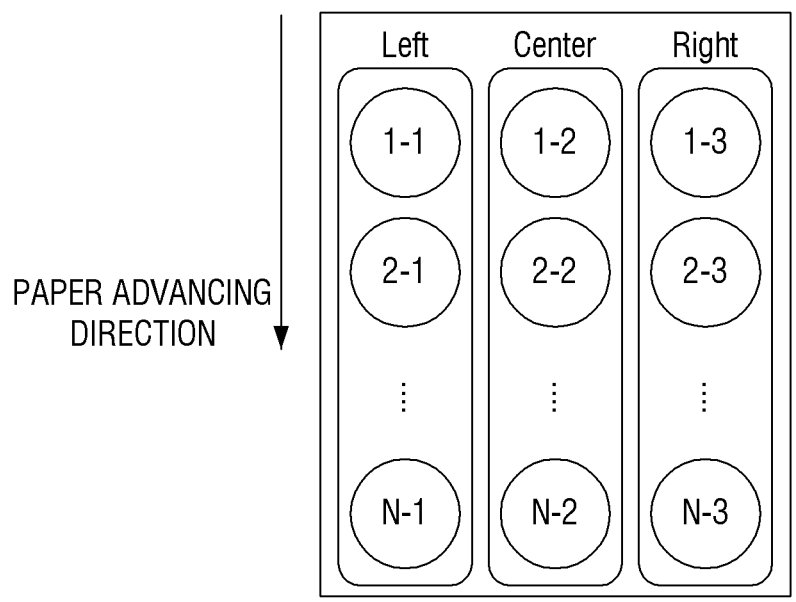
FIG. 10 illustrates a printed form of test pattern for color registration according to an embodiment.

FIG. 10 illustrates a printed form of a test pattern for color registration according to an embodiment. Referring to FIG. 10, the printed test pattern for color registration may include a plurality of pairs of a first color line 501 and combined lines 502. That is, the pairs of a first color line 501 and combined lines 502 may be printed on areas 1-1, 1-2, 1-3, ~N-3 of FIG. 10. This is to increase accuracy of color registration by calculating a plurality of location error values.

Figure 11:
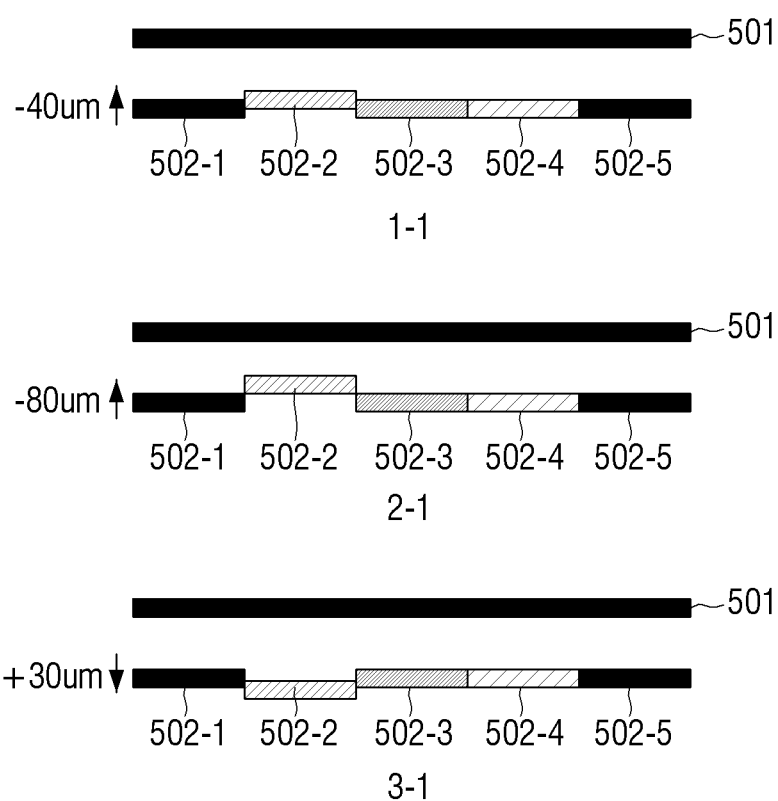
FIG. 11 illustrates an offset location error value according to an embodiment.

FIG. 11 illustrates an offset location error value according to an embodiment. For convenience of explanation, it is assumed that the first color line 501 and combined lines 502 pairs may be printed only on areas 1-1, 2-1, 3-1.

Referring to FIG. 11, a median location value of the third color line 502-2 at area 101 is moved from the median location value of the second color line 502-1,502-5 by −40 um, the median location value of the third color line 502-2 at area 2-1 is moved from the median location of the second color line 502-1,502-5 by −80 um, and the median location value of the third color line 502-2 at area 3-1 is moved from the median location of the second color line 502-1,502-5 by +30 um.

The controller 130 may calculate the offset location error value ((−40)+(−80)+(+30))/3=−30 um) that is an average moving distance of the third color line with reference to the second color line.

Although it may be assumed in FIG. 11 that the pairs of a first color line 501 and combined lines 502 may be printed only on areas 1-1, 2-1, 3-1, the first color line 501 and combined lines 502 pairs may be printed on more areas and the offset location error value may be calculated by taking such into consideration.

Figure 12:
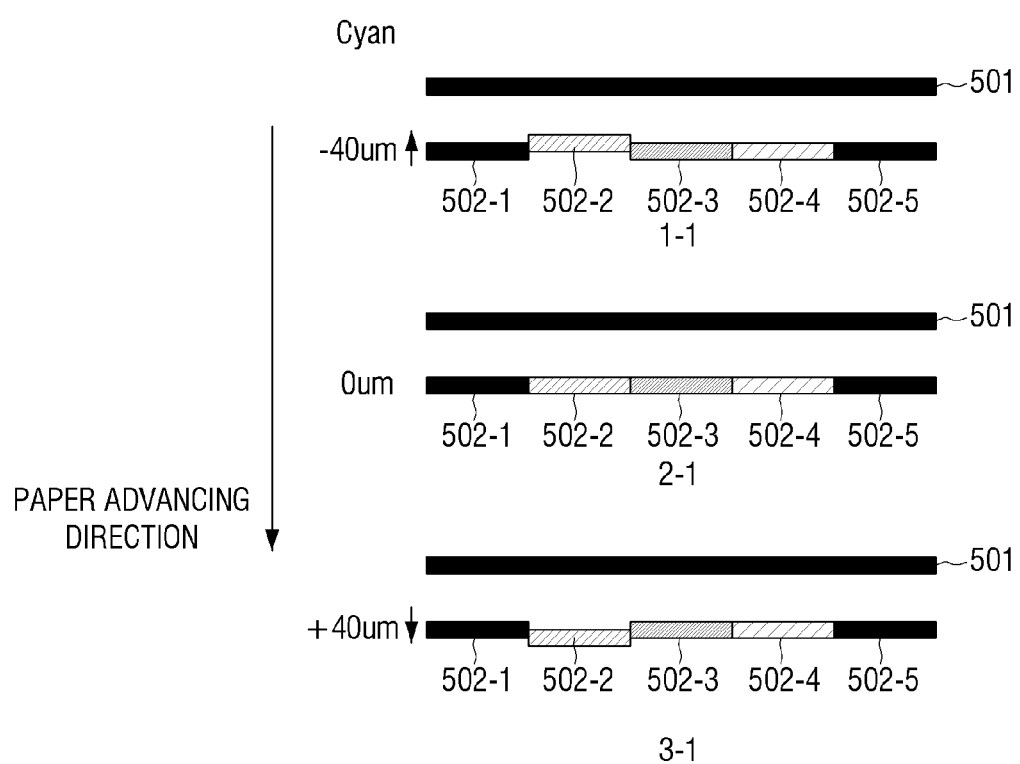
FIG. 12 illustrates a phase location error value according to an embodiment.

FIG. 12 illustrates a phase location error value according to an embodiment. It may be assumed that the pairs of first color line 501 and combined lines 502 are printed only on areas 1-1, 2-1, 3-1 for convenience of explanation.

Referring to FIG. 12, the median location value of the third color line 502-2 at area 101 may be moved from the median location value of the second color line 502-1,502-5 by −40 um, and the median location value of the third color line 502-2 at area 3-1 may be moved from the median location of the second color line 502-1,502-5 by +40 um. The phase location error value may be generated in the paper advancing direction, although there is no offset location error value, i.e., the average moving distance of the third color line 502-2 generated with reference to the second color line 502-1, 502-5 in the paper advancing direction.

The controller 130 may calculate the phase location error value, that is a phase difference of the third color line with reference to the second color line in the paper advancing direction.

It may be assumed in FIG. 12 that the pairs of a first color line 501 and combined lines 502 are printed only on areas 1-1, 2-1, 3-1, the pairs of a first color line 501 and combined lines 502 may be printed on the center area and/or the right area, in which case the phase location error value, i.e., the phase difference in the paper advancing direction can be calculated by taking such into consideration.

Figure 13:
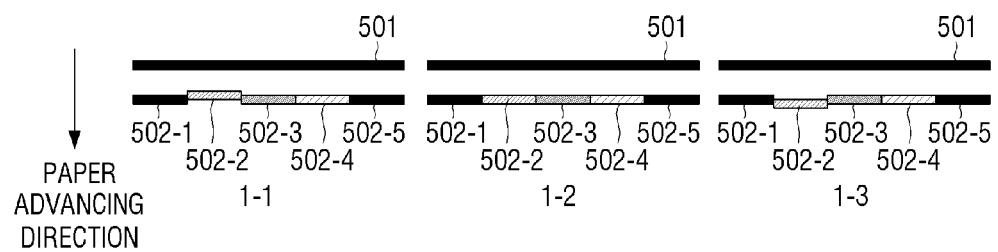
FIG. 13 illustrates a skew location error value according to an embodiment.

FIG. 13 illustrates a skew location error value according to an embodiment. It may be assumed that the pairs of a first color line 501 and combined lines 502 are printed only on areas 1-1, 2-1, 3-1 for convenience of explanation.

Referring to FIG. 13, the median location value of the third color line 502-2 at area 101 may be moved from the median location value of the second color line 502-1,502-5 by −40 um, and the median location value of the third color line 502-2 at area 3-1 may be moved from the median location of the second color line 502-1,502-5 by +40 um. The skew location error value may be generated in a direction perpendicular to the paper advancing direction, although there is no offset location error value, i.e., the average moving distance of the third color line 502-2 generated with reference to the second color line 502-1, 502-5 in the paper advancing direction.

The controller 130 may calculate the skew location error value, that is a phase difference of the third color line with reference to the second color line in a direction perpendicular to the paper advancing direction.

It may be assumed in FIG. 13 that the pairs of a first color line 501 and combined lines 502 are printed only on areas 1-1, 2-1, 3-1, the pairs of a first color line 501 and combined lines 502 may be printed on other areas, in which case the skew location error value, i.e., the phase difference in a direction perpendicular to the paper advancing direction can be calculated by taking such into consideration.

When the respective location error values are calculated according to the operations explained above, the controller 130 may perform color registration using the respective calculated location error values of the colors. The location errors occur in the respective colors mainly because of the precision of the laser in the main scan direction and driving of a motor in the sub-scan direction. Accordingly, the controller may perform color registration by controlling various elements of the image forming apparatus that can perform color registration, that is, by controlling writing timing of the laser or driving timing of the motor, by using the respective calculated location error values of the colors.

The controller 130 may compensate for a distortion value that is generated due to rotation of an image during printing of the test pattern for color registration or scanning of the printed test pattern for color registration, using the median location values of the second color lines on both ends from among the median location values. This is based on the principle that without distortion, the median location values of the second color line on both ends among the median location values of the combined lines will be identical.

When the color registration is performed, the controller 130 may control the image forming unit 110 to form the test pattern for color registration by reflecting the result of performing color registration. Accordingly, the user is able to check accuracy of the result of color registration, by checking the test pattern for color registration reflecting the result of color registration.

Figure 2:
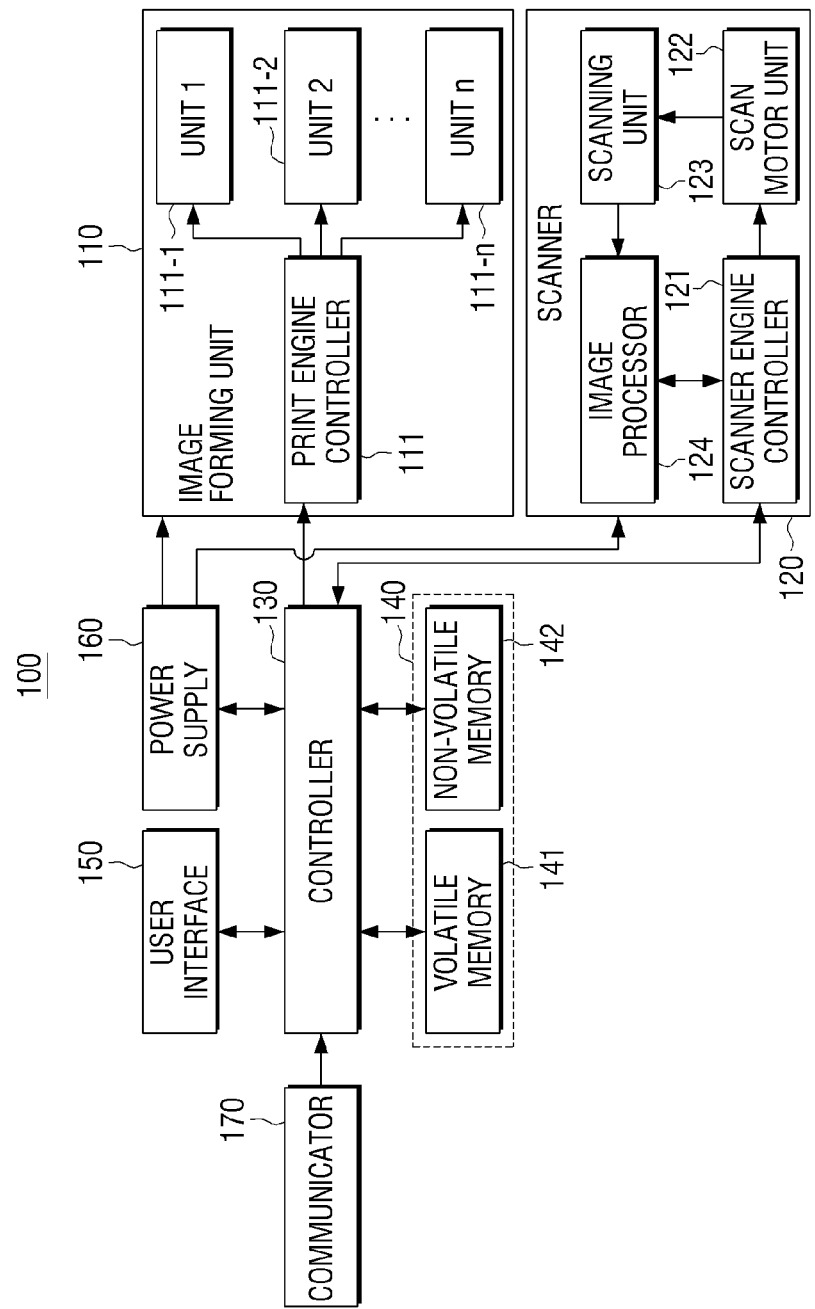
FIG. 2 illustrates an exemplary image forming apparatus.

FIG. 2 illustrates an exemplary image forming apparatus. The image forming apparatus 100 may include all or part of an image forming unit 110, a scanner 120, a controller 130, a storage 140, a user interface 150, a power supply 160, and a communicator 170. Although not illustrated, components such as a bus for data exchange among the components, or buffer for temporary data storage may also be included.

The communicator 170 may be connected to an external device via a network or locally, to receive data and commands. That is, the communicator 170 may be connected between a host PC and local interface, or a network by wired or wireless manner to be connected to a plurality of external devices. Wireless communication standard such as IEEE 802.11 of the Institute of Electrical and Electronics Engineers (IEEE) of U.S.A., the hyper LAN of Europe, or MMAC-PC of Japan may be used.

The user interface 150 may be provided to receive various commands to select from the user. The user interface 150 may include a display panel and one or more buttons. The display panel may be implemented as a touch screen. The user interface 150 may provide various UI screens, so that the user may directly touch the UI screen or manipulate the buttons on the user interface 150 to input commands. The commands may include commands to set various functions supported by the image forming apparatus, or perform mode change, operation stop and resume, color registration, or scan.

The power supply 160 supplies power to the respective components of the image forming apparatus. The power supply 160 may convert the externally-received commercial AC power (AC_IN) into DC power (DC_OUT) at the potential level appropriate for the respective components using devices such as transformer, inverter or rectifier and output the converted DC_OUT.

The controller 130 may control the image forming apparatus set according to data and commands of the external device connected thereto, or the user's select command or the like inputted via the user interface 150.

The image forming unit 110 may include a print engine controller 111 and a plurality of units 111-1~111-*n* operating for the printing job. The plurality of units 111-1~111-*n* may include the paper feeder that feeds printing paper, a charger that performs charging, a laser that performs writing, C, M, Y, K developers that perform developing, a OPC on which a printing image is developed, a transfer unit which performs transferring, a fuser that performs fusing, and a discharger that discharges output paper. The print engine controller 111 may control the respective units 111-1~111-*n* to print out a bitmap image as provided from the controller 130. Accordingly, the image forming unit 110 may print out the preset test pattern for color registration.

if a command to scan is inputted via the user interface 150, the controller 130 may control the scanner 120 to perform a scan job.

The scanner 120 may include a scanner engine controller 121, a scanning unit 123, a scan motor unit 122, and an image processor 124.

The scanner engine controller 121 may communicate with the controller 130 and controls the respective components of the scanner 120 to perform a scan job.

The scanning unit 123 plays a role of scanning an object. The scanning unit 123 may include an image reading sensor, a lens, and a light source. The CCD or CIS image sensor may generally be used as the image reading sensor. The image reading sensor may include an photoelectric converter that absorbs reflective ray of the light reflected from an object after the light generated at the light source is emitted onto an object and generates electric charge, and a signal detector (not illustrated) that detects the electric charge generated at the photoelectric converter and convert the generated electric charge into an electric signal.

The image processor 124 generates scan image data by performing processing such as shading and gamma correction, dot per inch (DPI) conversion, edge emphasis, or error diffusion. The predetermined resolution, the scan mode, the scan area, or the rate of expansion and reduction are considered for appropriate processing.

The scan motor unit 122 moves the scanning unit 123 or the printing paper so that the entire object is scanned. That is, the scan motor unit 122 moves different medium depending on whether the scanner operates by ADF or FLATBED scheme. For example, in the ADF scanner, the scan motor unit 122 moves printing paper, while the scan motor unit 122 moves the scanning unit 123 in the FLATBED scanner. The scan motor unit 122 may be implemented as a carriage return motor, or the like.

The scanner engine controller 121 may scan an object by driving the scanning unit 123 and the scan motor unit 122 in response to a command to scan received from the controller 130, and controls the image processor 124 to generate scan image data.

The storage 140 stores various information such as specification of the image forming apparatus, use status, print data, scan data, previously processed data, or printing log, and various application programs used in the image forming apparatus and the operating system (OS) are stored. The storage 140 may store the preset test pattern for color registration. The storage 140 may be so formed that it includes a volatile memory 141, and/or a non-volatile memory 142.

The volatile memory 141 may be used as a temporary storage space necessary for operation. That is, print data transmitted from the host PC, pre-scan data or scan data for copy purpose may be temporarily stored at the volatile memory 141, while various data and programs may be non-volatile stored at the non-volatile memory 142. Although FIG. 1 illustrates one volatile memory 141 and one non-volatile memory 142, the number and size of the memories may be variously designed to suit the characteristics of the image forming apparatus.

Figure 3:
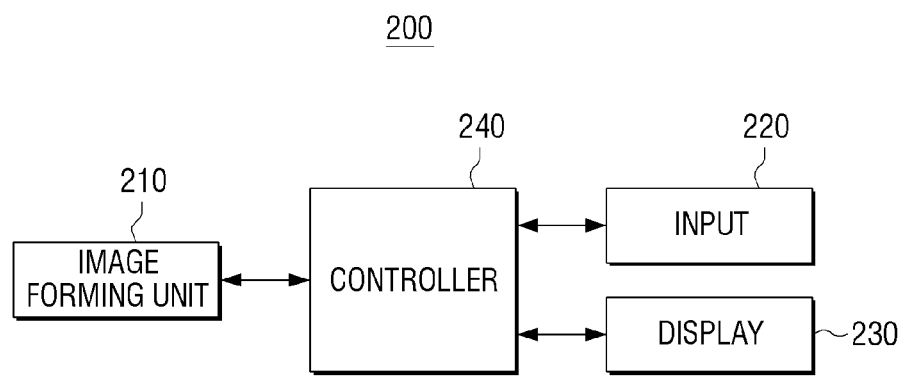
FIG. 3 illustrates an image forming apparatus according to an exemplary embodiment.

FIG. 3 illustrates an image forming apparatus according to an exemplary embodiment. Referring to FIG. 3, the image forming apparatus 200 may include all or part of the image forming unit 210, the input unit 220, the display unit 230, and the controller 240. The image forming apparatus 200 according to the second embodiment may be implemented as a simple printer that employs only the image forming unit 210 to perform printing function. The image forming apparatus 200 may be implemented as a laser image forming apparatus.

In describing FIG. 3, the redundant explanations about the constitution already explained above with reference to FIGS. 1 and 2 will be omitted for the sake of brevity.

The image forming unit 210 may perform the operation of the image forming unit 210 explained above.

The input 220 receives a user manipulation to the image forming apparatus 200. That is, the input 220 may receive an input of a user who inputs location error values of the respective colors.

A location error value(s) of respective colors as inputted may be calculated by using a scan image that is generated at the image reading device by scanning the printed test pattern for color registration of the image forming apparatus 200. That is, the user may scan the printed test pattern for color registration of the image forming apparatus with an image reading device such as a scanner, and transmit the scan image data generated according to the scanning to the host device connected thereto. The host device may calculate the location error value(s) of respective colors by performing a calculation of the location error value(s) of respective colors with the received scan image data. A host device may display the calculated "location error values of respective colors". A user may check the location error values of respective colors and input to the image forming apparatus 200.

The input 220 may be implemented as a capacitive or inductive touch sensor. The input 220 may be implemented as a high frequency resonant type proximity sensor that senses electric current induced by magnetic field characteristic that changes in response to the presence of an approaching object, or a magnetic type proximity sensor that uses magnet, or a capacitive type proximity sensor that senses capacitance varying in accordance with the presence of an approaching object. The input 220 may be implemented as a combined form of an input device such as a mouse, keyboard, or remote control with a display device such as the display 230. The input 220 may include one or more components that receive user input. The controller 240 may perform corresponding functions using the user input received via the input 220.

The display 230 displays a screen. The display 110 may display a screen to receive location error values of respective colors that are calculated using the printed test pattern for color registration.

FIG. 14 illustrates a screen to receive location error values of respective colors according to one embodiment. Referring to FIG. 14, the screen to receive location error values of respective colors includes areas to receive offset location error values, phase location error values, and skew location error values of each of cyan, magenta, and yellow colors. Because the second color line, which is applied as a reference in FIG. 14, may be set to a black line, an area to receive location error value for black color is omitted. However, the other colors, i.e., cyan, magenta and yellow color may be the second color line as a reference, and the area to receive location error value for black color may also be included in the screen, for example, illustrated in FIG. 14.

The display 230 may be implemented as at least one of liquid crystal display, thin film transistor-liquid crystal display, organic light-emitting diode, flexible display, 3D display, and transparent display.

The controller 240 may control the overall operation of the image forming apparatus 200. To be specific, the controller 240 may control all or part of the image forming unit 210, the input 220, and the display 230.

if the location error value is inputted to the screen displayed on the display 230, the controller 240 may control the image forming apparatus to perform color registration using the inputted location error value.

Figure 4:
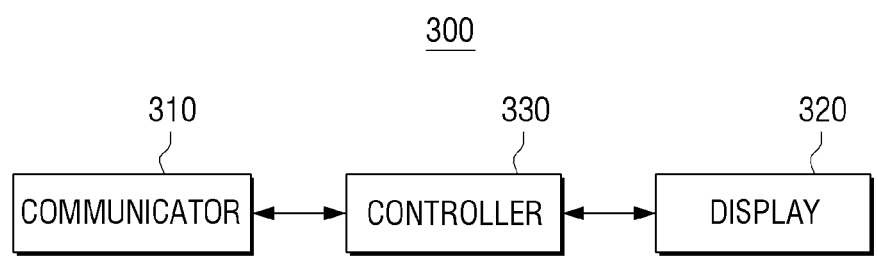
FIG. 4 illustrates a host apparatus according to an exemplary embodiment.

FIG. 4 illustrates a host device according to an exemplary embodiment. Referring to FIG. 4, the host device 300 may include all or part of a communicator 310, a display 320, and a controller 330. The host device 300 may be implemented as various devices including, for example, smartphone, tablet computer, laptop computer, desktop computer, personal digital assistance (PDA), or portable multimedia player each being connected to an image reading device such as a scanner. In describing an exemplary embodiment with reference to FIG. 4, the components already described with reference to FIGS. 1 to 3 are not redundantly described.

The communicator 310 may perform communication with various devices connected to the host device 300. The communicator 310 may receive from the image forming apparatus the scan image data that is generated according to the scanning of the printed test pattern for color registration of the image forming apparatus.

The display 320 may display a screen. The display 320 may display a screen to receive location error values of respective colors that are calculated using the printed test pattern for color registration.

The display 320 may be implemented as at least one of liquid crystal display, thin film transistor-liquid crystal display, organic light-emitting diode, flexible display, 3D display, and transparent display.

The controller 330 controls the overall operation of the host device 300. The controller 330 may control all or part of the communicator 310 and the display 320.

The controller 330 may detect the printed test pattern for color registration from the scan image data and calculate location error values of the respective colors using the detected test pattern for color registration.

The controller 330 may control the display 320 to display the calculated location error values of respective colors. Accordingly, the user is able to know the location error values of respective colors of the image forming apparatus that prints the test pattern for color registration, and perform color registration of the image forming apparatus using the location error values of respective colors.

If the host device 300 is connected to the image forming apparatus that prints the test pattern for color registration, the controller 330 may control the communicator 310 to transmit the calculated location error values of respective colors to the image forming apparatus connected thereto. Accordingly, the image forming apparatus is able to perform color registration using the received location error values.

Figure 6:
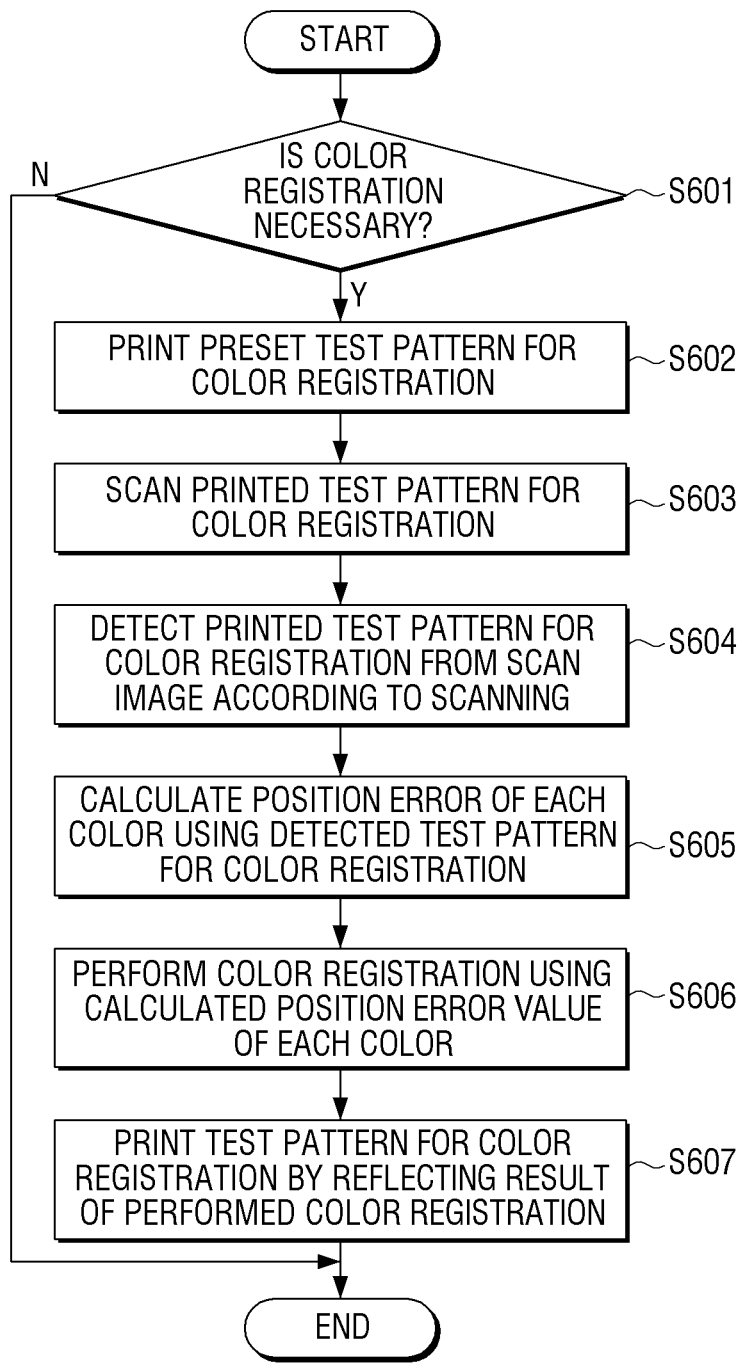
FIG. 6 illustrates a color matching method according to an exemplary embodiment.

FIG. 6 illustrates a color registration method according to an exemplary embodiment. Referring to FIG. 6, at S601, the image forming apparatus determines whether the color registration is necessary. The image forming apparatus may determine that color registration operation is necessary in response to a user command to perform color registration, if the printing exceeds preset pages of printing papers.

If determining that the color registration operation is necessary, at S602, the image forming apparatus prints the test pattern for color registration.

At S603, the image forming apparatus scans the printed test pattern for color registration. The scanning at S603 may be performed using a scanner provided in the image forming apparatus.

The image forming apparatus at S604 may detect the printed test pattern for color registration from the scan image obtained as a result of scanning. At S605, the image forming apparatus calculates the location error values of respective colors using the detected test pattern for color registration. At S606, the image forming apparatus performs color registration using the calculated location error values of the respective colors.

At S607, if the color registration is performed, the image forming apparatus prints the test pattern for color registration, by reflecting the result of the color registration performed.

Figure 7:
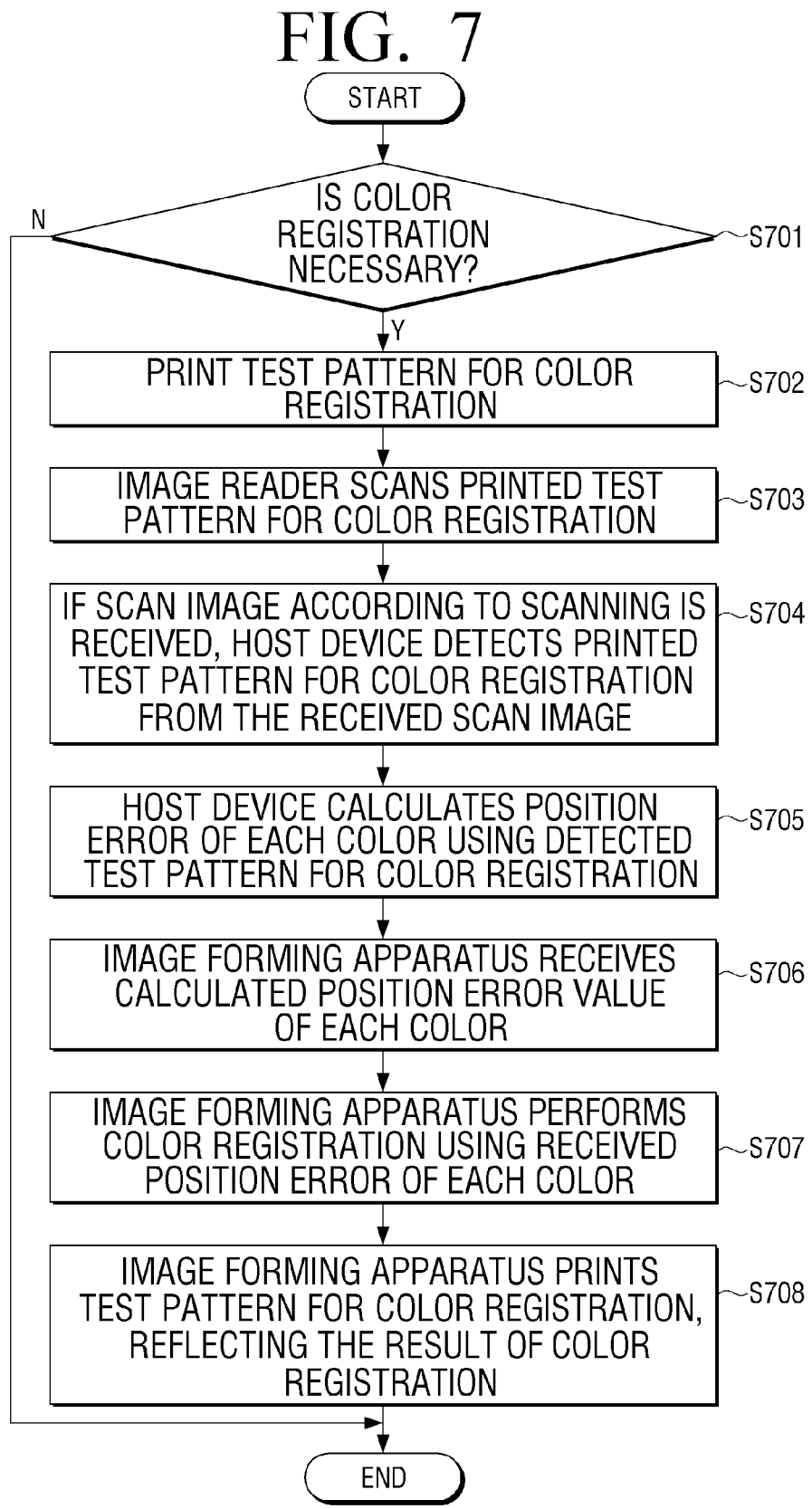
FIG. 7 illustrates a color matching method according to an exemplary embodiment.

FIG. 7 illustrates a color registration method according to an exemplary embodiment. Referring to FIG. 7, at S701, the image forming apparatus first determines whether the color registration is necessary.

At S702, if it is determined that color registration operation is necessary, the image forming apparatus prints the test pattern for color registration.

At S703, the image reading device scans the printed test pattern for color registration. The scanning at S703 may be performed by using an image reading device that is a separate object from the image forming apparatus.

If a scan image as a result of the scanning is received, at S704, the host device detects the printed test pattern for color registration from the received scan image. At S705, the host device calculates location error values of respective colors using the detected test pattern for color registration. The host device may display the calculated location error values of respective colors on a screen. If the host device is connected to the image forming apparatus that prints the test pattern for color registration, the host device may transmit the calculated location error values of respective colors to the image forming apparatus.

At S706, the image forming apparatus receives the calculated location error values of respective colors. The receiving at S706 may include manual receiving according to the input of the location error values by the user, or automatic receiving from the host device.

At S707, the image forming apparatus performs color registration using the location error values of respective colors as inputted.

At S708, if the color registration is performed, the image forming apparatus prints the test pattern for color registration, by reflecting the result of color registration as performed.

Figure 8:
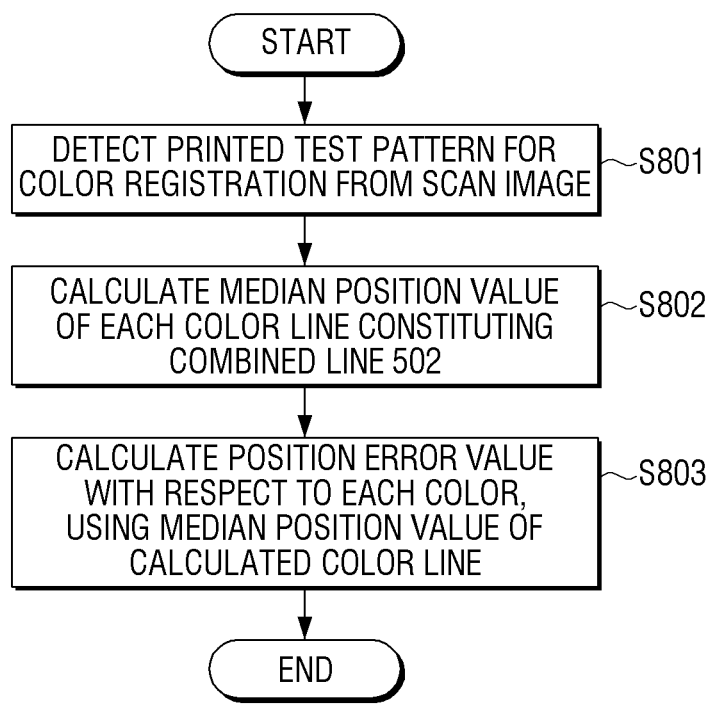
FIG. 8 illustrates a method for calculating a location error value with a color registration method according to an embodiment.

FIG. 8 illustrates a method for calculating the location error values of the color registration method according to an exemplary embodiment. The method for calculating the location error values as illustrated in FIG. 8 may be performed at an image forming apparatus, or at a host device.

Referring to FIG. 8, at S801, the printed test pattern for color registration is detected from the scan image. The detecting the printed test pattern for color registration may be performed by detecting the first color line of the scan image. Accordingly, the printed test pattern for color registration may be detected, including a plurality of pairs of first color line 501 and combined lines 502.

At S802, the median location values of the respective constituent color lines of the combined lines 502, i.e., the median location values of the second color line 502-1, the third color line 502-2, the fourth color line 502-3, the fifth color line 502-4, and the second color line 502-5 are calculated.

At S803, the location error values of respective colors are calculated, using the calculated median location values of the respective color lines.

Figure 9:
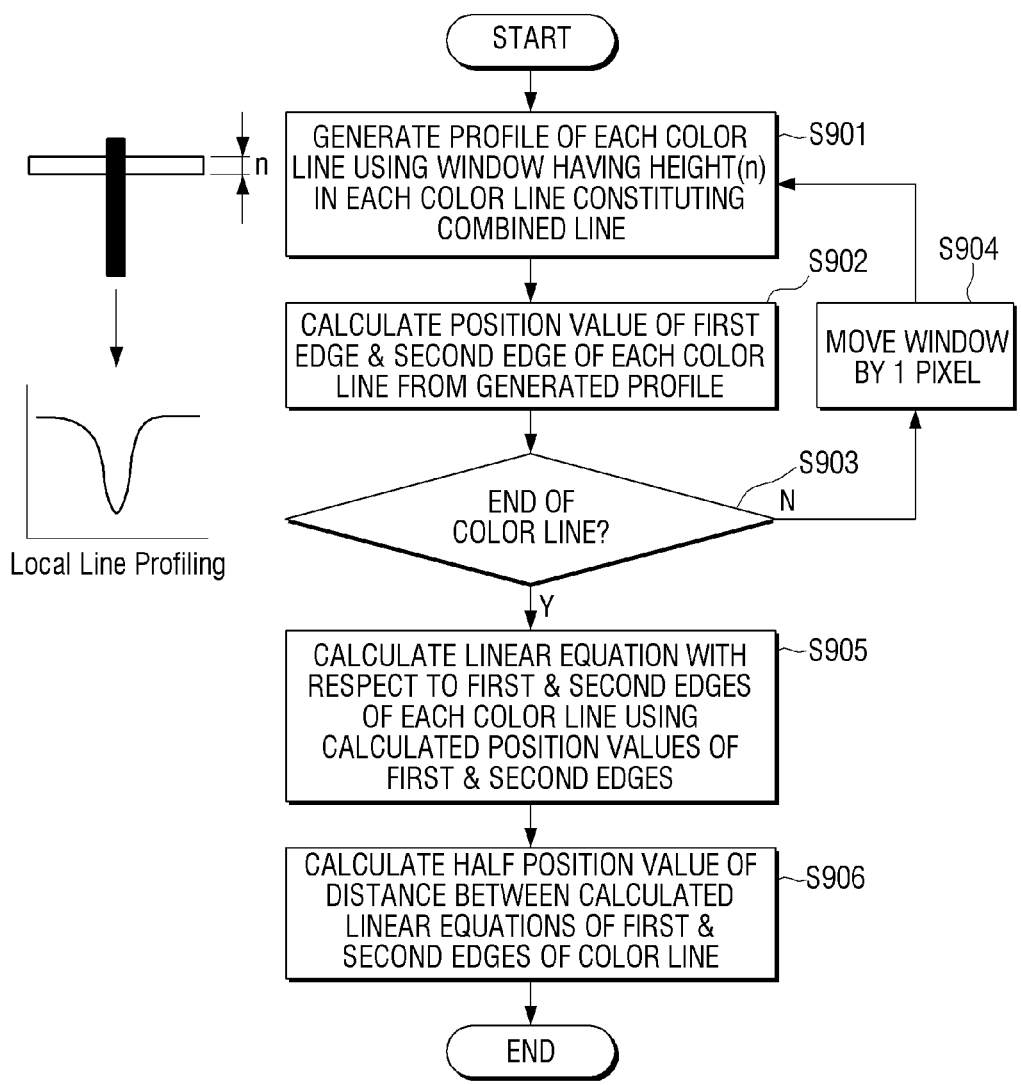
FIG. 9 illustrates a method for calculating a median position with a color registration method according to an embodiment.

FIG. 9 illustrates a method S802 for calculating median location values of the color registration method according to an exemplary embodiment. The method for calculating median location error values of FIG. 9 may be performed at an image forming apparatus, or at a host device.

Referring to FIG. 9, at S901, profiles of the respective color lines are generated, by reflecting a window of height (n) on the respective constituent color lines of the combined lines 501. Accordingly, the line profiling as illustrated in FIG. 9 may be performed.

At S902, location values of a first edge and a second edge of the respective color lines are calculated based on the generated profiles. The location values of the first and second edges may be calculated using thresholds of the line profiling. That is, the location values of the left and right edges may be calculated in the example of FIG. 9.

At S903, it is determined if the applied window of height (n) is placed at an end of each color line. At S903: N, if the window is not placed at the end of each color line, at S904, the window is moved by one pixel. That is, the window may be moved by one pixel downward in FIG. 9. At S903:Y, if the applied window is placed at the end of each color line, at S905, linear equations regarding the first and second edges of each color line are calculated using the calculated location values of the first and second edges. The linear equations for the first and second edges of each color line may be calculated using line fitting.

At S906, the middle location value of a distance between the calculated linear equations of the first and second edges of each color line is calculated.

The middle location of the distance between the linear equations of each color line may be a median location value of each color line.

The color registration methods of the image forming apparatus, and the control method of the host device according to various embodiments explained above may be implemented in the form of program code and stored at various non-transitory computer readable media and provided to respective devices.

The non-transitory computer readable medium as used herein refers to any medium that can semi-permanently store data, rather than a medium that can store data for a brief period time such as a register, cache or memory. Applications or programs explained above may be provided in a non-transitory computer readable medium such as a CD, DVD, hard disk, blu-ray disk, USB, memory card, or ROM.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims.

What is claimed is:

1. A color registration method of an image forming apparatus, comprising:
   printing a preset test pattern for color registration on a printing paper;
   generating a scan image by scanning the printing paper on which is printed the preset test pattern for color registration;
   detecting the printed test pattern for color registration from the scan image;
   calculating location error values of respective colors, using the detected test pattern for color registration; and
   performing the color registration using the calculated location error values of respective colors,
   wherein the preset test pattern for color registration comprises a plurality of pairs of a first color line and combined lines of a second color line, a third color line, a fourth color line, a fifth color line, and a second color line in sequence, and
   the first color is one of cyan C, magenta M, yellow Y, and black K, and
   the second, third, fourth and fifth colors are different colors from each other with one of each of cyan C, magenta M, yellow Y and black K,
   wherein the detecting the printed test pattern for color registration comprises detecting the printed test pattern for color registration by detecting the first color line from the scan image, and
   the calculating comprises:
      calculating median location values of respective color lines constituting the combined lines, and
      calculating the location error values for respective colors using the calculated median location values of respective color lines,
   wherein the calculating the median location values of respective color lines constituting the combined lines comprises:
      calculating location values of a first edge and a second edge of the respective color lines;
      calculating linear equations for the first and second edges, using the calculated location values of the first and second edges; and
      calculating the median location values based on middle locations of a distance between the calculated linear equations of the first and second edges.

2. A color registration method of an image forming apparatus, comprising:
   printing a preset test pattern for color registration on a printing paper;
   generating a scan image by scanning the printing paper on which is printed the preset test pattern for color registration;
   detecting the printed test pattern for color registration from the scan image;
   calculating location error values of respective colors, using the detected test pattern for color registration; and
   performing the color registration using the calculated location error values of respective colors,
   wherein the preset test pattern for color registration comprises a plurality of pairs of a first color line and combined lines of a second color line, a third color line, a fourth color line, a fifth color line, and a second color line in sequence, and
   the first color is one of cyan C, magenta M, yellow Y, and black K, and
   the second, third, fourth and fifth colors are different colors from each other with one of each of cyan C, magenta M, yellow Y and black K,
   wherein the detecting the printed test pattern for color registration comprises detecting the printed test pattern for color registration by detecting the first color line from the scan image, and
   the calculating comprises:
      calculating median location values of respective color lines constituting the combined lines, and
      calculating the location error values for respective colors using the calculated median location values of respective color lines,
   further comprising compensating distortion of the scan image using the median location values of the second color line at both ends, among the calculated median location values of the combined lines.

3. A color registration method of an image forming apparatus, comprising:
   printing a preset test pattern for color registration on a printing paper;
   generating a scan image by scanning the printing paper on which is printed the preset test pattern for color registration;
   detecting the printed test pattern for color registration from the scan image;
   calculating location error values of respective colors, using the detected test pattern for color registration; and
   performing the color registration using the calculated location error values of respective colors,
   wherein the preset test pattern for color registration comprises a plurality of pairs of a first color line and combined lines of a second color line, a third color line, a fourth color line, a fifth color line, and a second color line in sequence, and
   the first color is one of cyan C, magenta M, yellow Y, and black K, and
   the second, third, fourth and fifth colors are different colors from each other with one of each of cyan C, magenta M, yellow Y and black K,
   wherein the detecting the printed test pattern for color registration comprises detecting the printed test pattern for color registration by detecting the first color line from the scan image, and the calculating comprises:
    calculating median location values of respective color lines constituting the combined lines, and
    calculating the location error values for respective colors using the calculated median location values of respective color lines,
wherein the calculating the location error values comprises:
    calculating an offset location error value that is an average moving distance of each of the third, fourth and fifth color lines included in the combined lines with respect to the calculated median location value of the second color line;
    calculating a phase location error value that is a difference of phase in the paper advancing direction of the third, fourth, and fifth color lines included in the combined lines with respect to the calculated median location value of the second color line; and
    calculating a skew location error value that is a difference of phase in the vertical direction to the paper advancing direction of the third, fourth and fifth color lines included in the combined lines with respect to the calculated median location value of the second color line.

4. An image forming apparatus comprising:
an image forming unit that prints a preset test pattern for color registration on a printing paper;
a scanner that generates a scan image by scanning the printing paper on which is printed the test pattern for color registration; and
a controller that detects the printed test pattern for color registration from the scan image, calculates location error values of respective colors using the detected test pattern for color registration, and controls the image forming apparatus to perform color registration using the calculated location error values of respective colors,
wherein the preset test pattern for color registration comprises a plurality of pairs of a first color line and combined lines of a second color line, a third color line, a fourth color line, a fifth color line, and a second color line in sequence, and
the first color is one of cyan C, magenta M, yellow Y, and black K, and
the second, third, fourth and fifth colors are different colors from each other and each be one of cyan C, magenta M, yellow Y and black K,
wherein the controller detects the printed test pattern for color registration by detecting the first color line from the scan image, and
calculates median location values of respective color lines constituting the combined lines, and calculates the location error values for respective colors using the calculated median location values of respective color lines,
wherein the controller calculates location values of a first edge and a second edges of the respective color lines, calculates linear equations for the first and second edges, using the calculated location values of the first and second edges, and calculates the median location values based on middle locations of a distance between the calculated linear equations of the first and second edges.

5. An image forming apparatus comprising:
an image forming unit that prints a preset test pattern for color registration on a printing paper;
a scanner that generates a scan image by scanning the printing paper on which is printed the test pattern for color registration; and
a controller that detects the printed test pattern for color registration from the scan image, calculates location error values of respective colors using the detected test pattern for color registration, and controls the image forming apparatus to perform color registration using the calculated location error values of respective colors,
wherein the preset test pattern for color registration comprises a plurality of pairs of a first color line and combined lines of a second color line, a third color line, a fourth color line, a fifth color line, and a second color line in sequence, and
the first color is one of cyan C, magenta M, yellow Y, and black K, and
the second, third, fourth and fifth colors are different colors from each other and each be one of cyan C, magenta M, yellow Y and black K,
wherein the controller detects the printed test pattern for color registration by detecting the first color line from the scan image, and
calculates median location values of respective color lines constituting the combined lines, and calculates the location error values for respective colors using the calculated median location values of respective color lines,
wherein the controller compensates distortion of the scan image using the median location values of the second color line at both ends, among the calculated median location values of the combined lines.

6. An image forming apparatus comprising:
an image forming unit that prints a preset test pattern for color registration on a printing paper;
a scanner that generates a scan image by scanning the printing paper on which is printed the test pattern for color registration; and
a controller that detects the printed test pattern for color registration from the scan image, calculates location error values of respective colors using the detected test pattern for color registration, and controls the image forming apparatus to perform color registration using the calculated location error values of respective colors,
wherein the preset test pattern for color registration comprises a plurality of pairs of a first color line and combined lines of a second color line, a third color line, a fourth color line, a fifth color line, and a second color line in sequence, and
the first color is one of cyan C, magenta M, yellow Y, and black K, and
the second, third, fourth and fifth colors are different colors from each other and each be one of cyan C, magenta M, yellow Y and black K,
wherein the controller detects the printed test pattern for color registration by detecting the first color line from the scan image, and
calculates median location values of respective color lines constituting the combined lines, and calculates the location error values for respective colors using the calculated median location values of respective color lines,
wherein the controller calculates the location error values comprising:
    an offset location error value that is an average moving distance of each of the third, fourth and fifth color lines included in the combined lines with respect to the calculated median location value of the second color line;
    a phase location error value that is a difference of phase in the paper advancing direction of the third, fourth, and fifth color lines included in the combined lines with respect to the calculated median location value of the second color line; and a skew location error value that is a difference of phase in the vertical direction to the paper advancing direction of the third, fourth and fifth color lines included in the combined lines with respect to the calculated median location value of the second color line.

* * * * *